United States Patent [19]

Chen

[11] Patent Number: 5,215,320

[45] Date of Patent: Jun. 1, 1993

[54] STROLLER

[75] Inventor: Hung-Tsun Chen, Taichung Shan, Taiwan

[73] Assignee: Kiddyco Juvenile Products Corporation, Taichung Shan, Taiwan

[21] Appl. No.: 960,769

[22] Filed: Oct. 14, 1992

[51] Int. Cl.$^5$ .............................................. B62B 7/12
[52] U.S. Cl. .............................. 280/47.36; 280/47.38; 280/642; 16/35 R
[58] Field of Search ............... 280/638, 639, 642, 651, 280/655, 47.36, 47.38, 47.34, 304.1, 47.39; 16/35 R

[56] References Cited

U.S. PATENT DOCUMENTS

| | | | |
|---|---|---|---|
| 4,608,729 | 9/1986 | Huang | 16/35 R |
| 4,759,098 | 7/1988 | Ko | 280/47.38 |
| 4,831,689 | 5/1989 | Lo | 280/47.38 |
| 5,125,676 | 6/1992 | Teng | 280/47.38 |

Primary Examiner—Richard M. Camby
Attorney, Agent, or Firm—Pro-Techtor International

[57] ABSTRACT

A stroller comprises a seat, a fork-type handlebar interchangeable between a forward and a backward positions with respect to the seat, four wheel sets divided into two pairs, each pair consisting of a front and a rear wheel sets at respective lateral side of the seat, with related support tubes provided therein an extending wire, connecting to respective twin lock pins at opposite ends in cooperation with associated twin lock holes formed around respective vertical spindle of the wheel sets, and a pair of actuators on the support tubes at opposite sides of the seat. The front wheel sets are swivel freely while the rear wheel sets can only move fore and aft in a predetermined orientation when the handlebar is at the forward position, and vice versa when the handlebar is at the backward position.

3 Claims, 4 Drawing Sheets

STROLLER

FIELD OF THE INVENTION

This invention generally relates to a stroller, and particularly to the stroller having a handlebar interchargeable between a forward and backward positions to automatically change the running behavior of the wheel sets of said stroller.

BACKGROUND OF THE INVENTION

Taiwan Utility Model application No. 80207218 filed on Jun. 13, 1991, disclosed a stroller having a handlebar interchangeable between a forward and a backward positions with respect to the seat, with the front wheel sets thereof swivel freely while the rear wheel sets move fore and aft at random orientation when said handlebar at the forward position, and vice versa when said handlebar at the backward position. At random orientation the locking lever at fixed location on the respective wheel set is occasionally difficult to operate. In addition, said handlebar is interchanged between said positions by a wire through a block disposed inside of the support tubes of the wheel sets. When said tubes are indented or deformed inadvertently said block will be obstructed at the defect place, resulting the malfunction on the interchanging operation. Moreover, one pin to one hole engagement causes the wheel set unstable.

SUMMARY OF THE INVENTION

It is the primary object to the present invention to provide a stroller in which, when the handlebar is interchanged between different positions, the wheel sets at remote side with respect to the operator are swivel freely and the wheel sets at nearer side are automatically placed to move fore and aft only in a predetermined orientation in order to have the wheel locking levers always presented at the side toward the operator of the stroller for facilitating to manipulate and enhancing the stability.

Another object of the present invention is to provide aforementioned stroller in which the interchanging of the handlebar is exclusively manipulated via a wire which would not be blocked within the support tubes in any event.

Aforementioned and other objects, features and advantages will be apparent from the following description in detail with reference to the preferred embodiments as shown in the accompanying drawings.

DETAILED DESCRIPTION OF THE PREFERRED EMBODIMENTS

Figure 1:
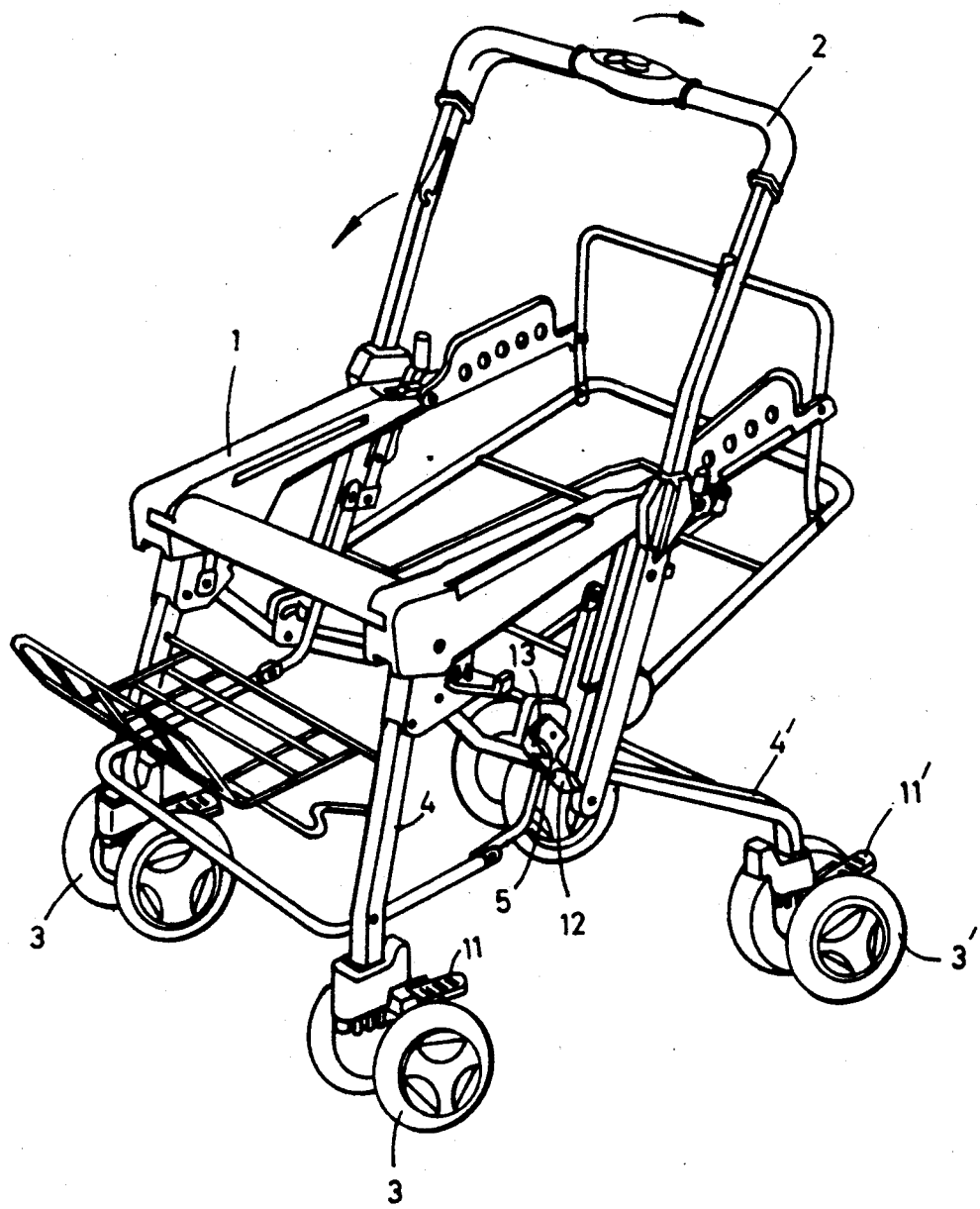
FIG. 1 is a perspective view of the stroller according to the present invention.

Now, with reference to FIG. 1, the stroller according to the present invention comprises a seat represented by the frame 1 for the convenience of illustration, a fork-type handlebar 2 in forward position, four wheel sets divided into two pairs, each pair consisting of a front wheel set 3 and a rear wheel set 3' with related support tubes 4, 4', and a pair of actuators 5 at opposite sides of the seat 1. Other parts irrelevant to the present invention will be neglected in description hereunder.

Figure 2:
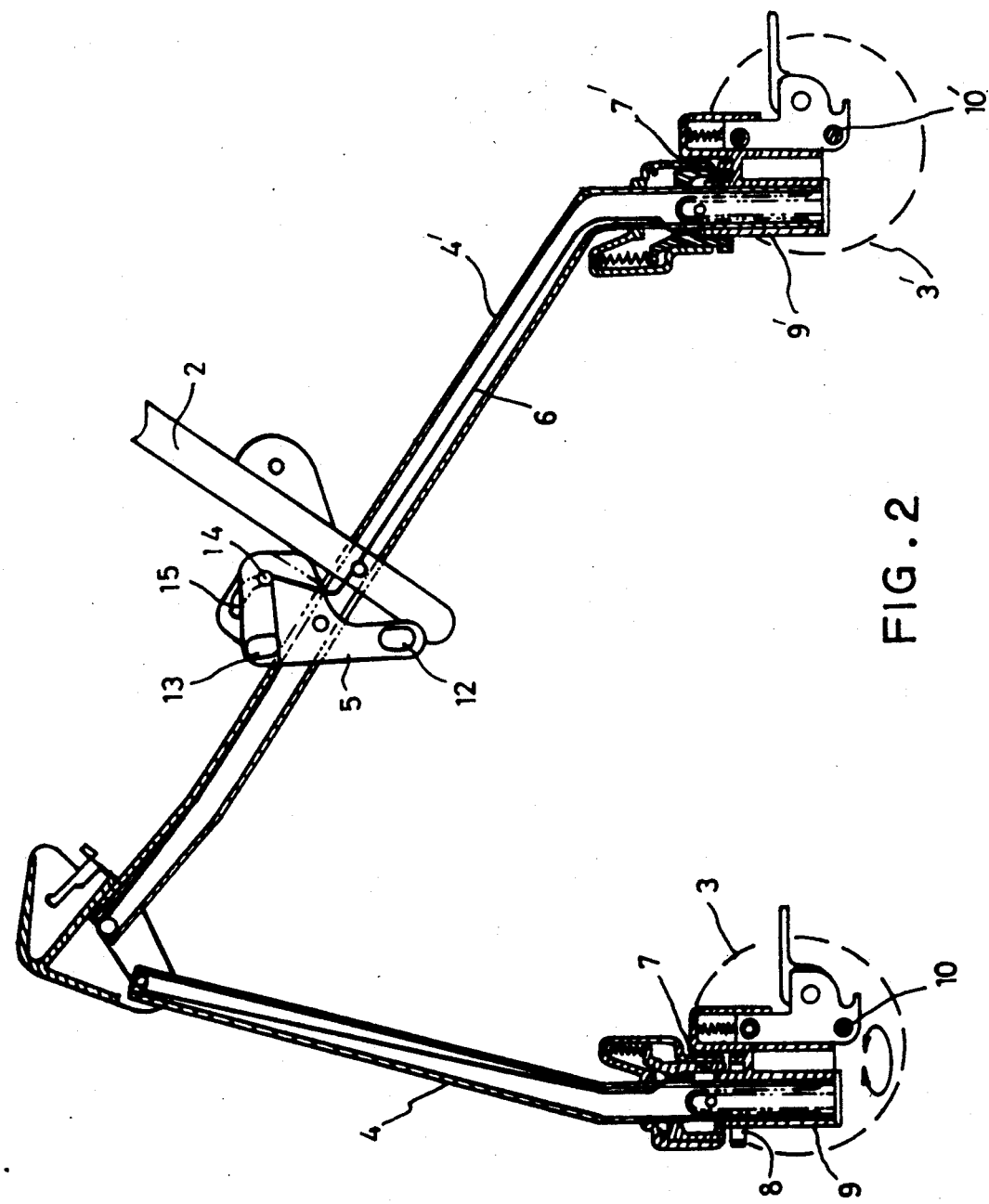
FIG. 2 is a fragmentary structure in partial cross section with the handlebar at forward position and the wheel sets represented by dash lines.

As referred to FIG. 2, a wire 6 is extended inside of the tubes 4, 4' and connected to respective twin lock pins 7, 7' at opposite ends. Two pins in each twin lock pins 7 or 7' are disposed in the diametrical locations. The twin lock holes 8, 8' consisting of two holes at diametrical locations are provided around respective vertical spindle 9 or 9' on the wheel sets 3, 3'.

Each wheel set 3 or 3' consists of two wheels interconnected side by side through a central axle 10 or 10'. The spindle 9 or 9' is eccentrically provided above said axle 10 or 10' as shown. A wheel locking lever 11 or 11' is pivotably mounted between two wheels of each wheel set 3 or 3' and extended in a direction away from the spindle 9 or 9'. The lever 11 or 11' is pushed down to lock the wheel 3 or 3' by inserting a rod into one of the notches around the hub (all not shown) to lock said wheel in fixed state.

Each actuator 5 is pivotably provided on respective support tube 4' of rear wheel set 3'. The actuator 5 comprises a forward pusher 12, a backward pusher 13 and a limit stub 14. The limit stub 14 is engaged with said wire 6 at intermediate point thereof and received within a slot 15 in such that can be movable therein between opposite extremities.

Figure 4:
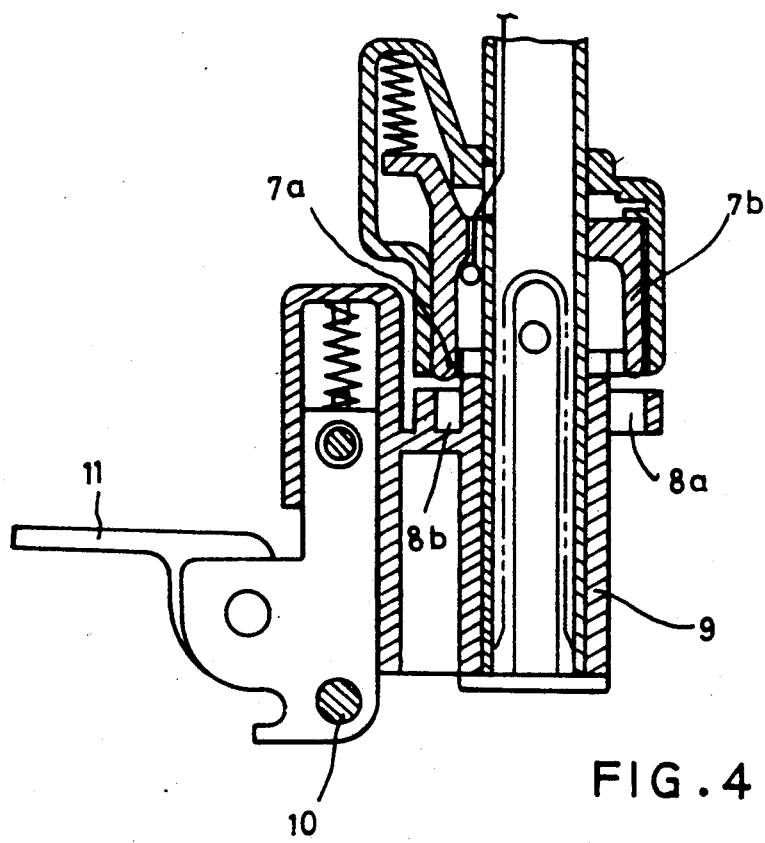
FIG. 4 is a partial cross section to illustrate the lock pins impossible to engage with corresponding lock holes.

Turning now to FIG. 4 it is seen that one lock pin 7a having an outer diameter greater than that of other pin 7b in each twin lock pins 7 or 7'. Correspondingly, one lock hole 8a having an inner diameter greater than that of other hole 8b in each twin lock holes 8 or 8'.

The forked ends of the handlebar 2 are pivotably mounted on the tubes 4' in the proximity of respective actuator 5. In the forward position as shown in FIG. 1, respective end of the handlebar 2 is pressed against the forward pusher 12 of the actuator 5, with the stub is moved and restricted by right extremity in the slot 15, as best seen from FIG. 2, to pull the wire 6 making the pins 7 out of the corresponding holes 8 in the front wheel sets 3 and simultaneously to push said wire 6 causing the pins 7' inserted into the corresponding holes 8' in the rear wheel sets 3', so that said front wheel sets 3 are swivel freely but said rear wheel sets 3' can only move fore and aft.

Figure 3:
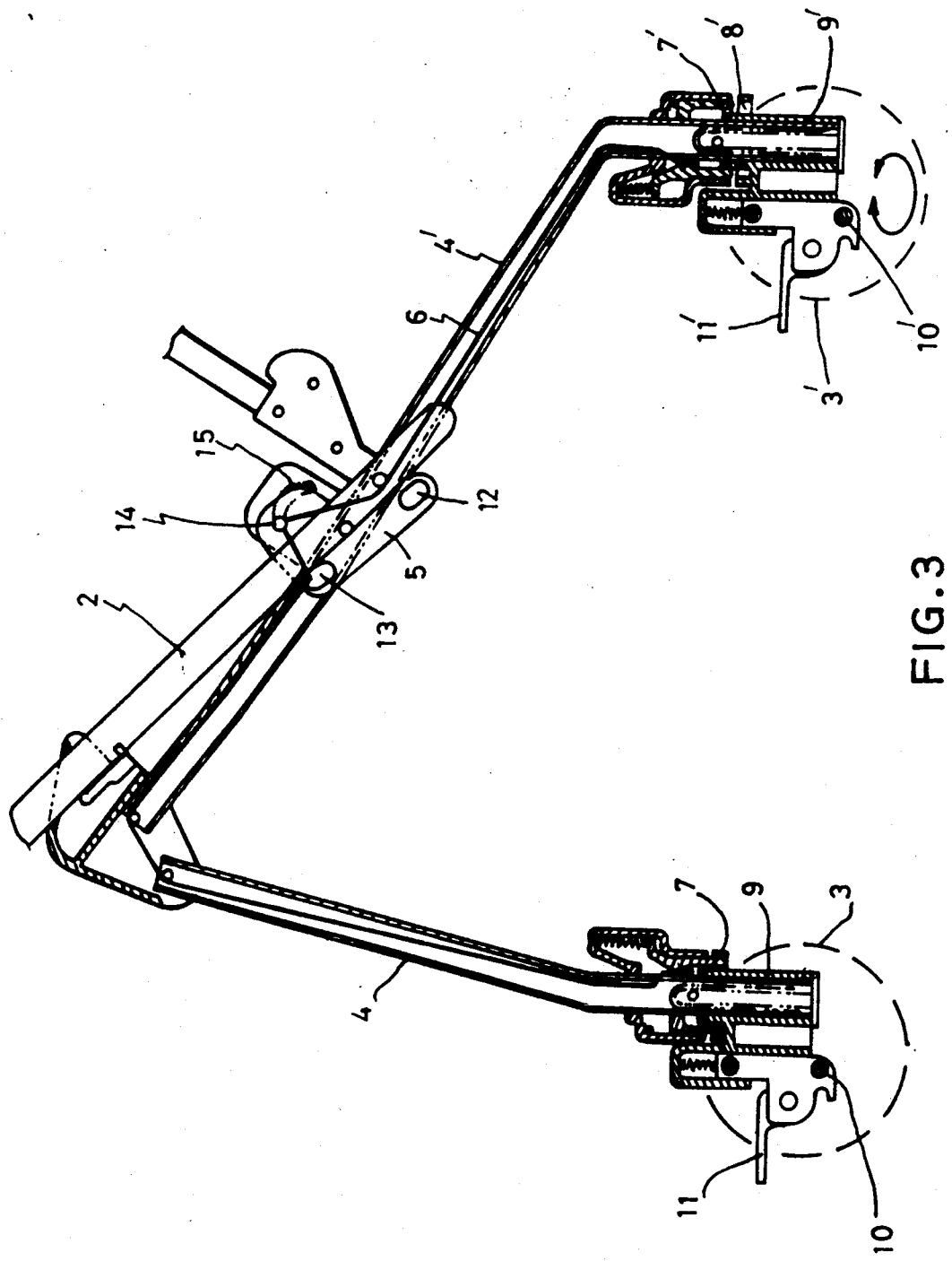
FIG. 3 is a fragmentary structure in partial cross section with the handlebar at backward position and the wheel sets represented by dash lines.

When the handlebar 2 is pivotably moved forwards to the backward position, as shown in FIG. 3, the lower portion closed to the end of said handlebar 2 is pressed onto the backward pusher 13 of the actuator 5, with the stub 14 is moved and restricted by left extremity in the slot 15 as shown, to pull the wire 6 making the pins 7' out of the corresponding holes 8' in the rear wheel sets 3' and simultaneously to push said wire 6 causing the pins 7 inserted into the corresponding holes 8 in the front wheel sets 3, just in the opposition as referred to FIG. 2, so that said rear wheel sets 3' are swivel freely but said front wheel sets 3 can only move fore and aft.

Figure 5:
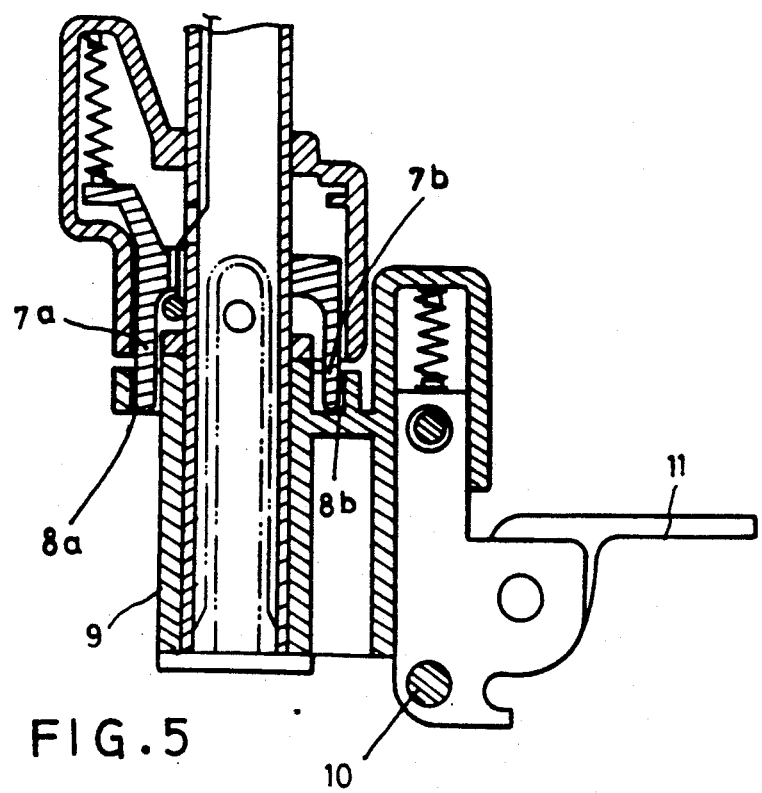
FIG. 5 is a partial cross-section to illustrate the lock pins engaging with corresponding lock holes.

As referred to FIGS. 4 and 5, since the pins 7a and 7b are correspondingly cooperated with the holes 8a and 8b, respectively, and said pin 7a and said hole 8a have greater diameter than other pin 7b and hole 8b respectively, so that said pin 7a can be only inserted into said hole 8a rather than other hole 8b. Therefore, at the beginning when said handlebar 2 is changed to the backward position, said front wheel set 3 is still swivelled a while until the greater hole 8a is aligned with corresponding greater pin 7a. The said pin 7a is automatically dropped into said hole 8a. Accordingly the smaller pin 7b is also dropped into the smaller hole 8b, as shown in FIG. 5, to stop said front wheel set 3 from swivelling, and to maintain it moving fore and aft. Even the greater hole 8a comes to align with the smaller pin 7b, another pin 7a is impossible to engage with the smaller hole 8b, as shown in FIG. 4, so that the wheel set 3 will swivel temporarily.

In this way, as soon as the wheel sets 3 is in order, the position of said wheel sets 3 will be in such that the wheel locking levers 11 are extended in a direction outwards to the side of the operator of the stroller for convenience to manipulate said levers 11 as desired. Moreover, in this state, the wheel sets would be at the outward position due to their eccentric arrangement with respect to corresponding spindle 9 as mentioned above, for enhancing the stability of whole stroller.

Further, with the present stroller the interchanging operation of the handlebar 2 is exclusively carried out via a wire 6 only, no malfunction would be happened even though the tubes 4, 4' are inadvertently indented or deformed.

It should of course be noted that the preceding description relates to particular preferred embodiment of the invention only and that many modification are possible within the broad scope of the invention.

What I claim is:

1. A stroller comprising essentially a seat;

a handlebar in fork-type, interchangeable between a forward and a backward positions with respect to said seat;

four wheel sets divided into two pairs, each pair consisting of a front and a rear wheel sets at respective lateral side of said seat, with related support tubes;

a pair of wires extended respectively within said tubes and connected to respective twin lock pins at opposite ends in cooperation with associated tin lock holes formed around respective vertical spindle of said wheel sets, in which said twin lock pins consisting of one pin having greater outer diameter and other pin having smaller outer diameter, and said twin lock holes consisting of one hole having greater inner diameter in cooperation with said one pin and other hole having smaller inner diameter in cooperation with said other pin; and a pair of actuators respectively on said support tubes at opposite sides of said seat, each comprising a forward and a backward pusher, and a limit stub engaged with said wire at an intermediate point and movable within a slot between opposite extremities thereof;

whereby said front wheel sets are swivel freely while said rear wheel sets can only move fore and aft in a predetermined orientation when said handlebar is at the forward position, and vice versa when said handlebar is at the backward position.

2. The stroller as set forth in claim 1 wherein each wheel set is provided with a wheel locking lever extended in the direction away from said spindle.

3. The stroller as set forth in claim 2, wherein said twin lock pins and said twin lock holes are so arranged that when said greater and smaller pins in said twin lock pins are correspondingly engaged with said greater and smaller holes in said twin lock holes, respectively, then said wheel sets are so oriented that said wheel locking levers are always presented at the side toward the operator of said stroller.

* * * * *